(12) United States Patent
Lei et al.

(10) Patent No.: US 10,158,927 B1
(45) Date of Patent: Dec. 18, 2018

(54) SYSTEMS AND METHODS FOR DETECTING AUDIO-VIDEO SYNCHRONIZATION USING TIMESTAMPS

(75) Inventors: Yong Lei, Cupertino, CA (US); Ke Yang, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 958 days.

(21) Appl. No.: 13/603,571

(22) Filed: Sep. 5, 2012

(51) Int. Cl.
*H04N 21/43* (2011.01)
*H04N 21/2368* (2011.01)
*H04N 21/8547* (2011.01)

(52) U.S. Cl.
CPC ..... *H04N 21/8547* (2013.01); *H04N 21/2368* (2013.01); *H04N 21/4307* (2013.01)

(58) Field of Classification Search
CPC ........... H04N 21/8547; H04N 21/4307; H04N 21/2368
USPC ........................................................ 709/231
See application file for complete search history.

(56) References Cited

U.S. PATENT DOCUMENTS

| | | | | |
|---|---|---|---|---|
| 6,101,591 | A * | 8/2000 | Foster | H04N 21/4307 345/565 |
| 6,414,960 | B1 | 7/2002 | Kuhn et al. | |
| 6,421,445 | B1 | 7/2002 | Jensen et al. | |
| 6,674,803 | B1 * | 1/2004 | Kesselring | H04N 21/23608 375/240.26 |
| 7,586,544 | B2 | 9/2009 | Han et al. | |
| 7,996,750 | B2 | 8/2011 | Wang et al. | |
| 8,712,728 | B2 * | 4/2014 | Moskowitz | G06F 17/30964 341/155 |
| 8,938,089 | B1 * | 1/2015 | Postelnicu | G06K 9/00751 382/100 |
| 2003/0088397 | A1 * | 5/2003 | Karas | G06F 17/30017 704/1 |
| 2003/0198256 | A1 * | 10/2003 | Wang | H04N 5/04 370/503 |
| 2005/0146448 | A1 * | 7/2005 | Evans | H04N 21/2368 341/50 |
| 2005/0177633 | A1 * | 8/2005 | Plunkett | B41J 2/04505 709/225 |
| 2006/0013565 | A1 * | 1/2006 | Baumgartner | 386/96 |
| 2006/0271983 | A1 * | 11/2006 | Katayama | H04N 5/04 725/100 |

(Continued)

*Primary Examiner* — Philip J Chea
*Assistant Examiner* — Wing Ma
(74) *Attorney, Agent, or Firm* — Young Basile Hanlon & MacFarlane, P.C.

(57) ABSTRACT

Systems and techniques for testing audio-video synchronization using one or more timestamps are presented. On a media sender end, a media stream with a video stream and an audio stream is generated. A matrix barcode timestamp is added onto a video frame of the video stream at a particular time. Furthermore, a tone timestamp is embedded into the audio stream at the particular time. Additionally, on a media receiver end, a modified media stream is received. For example, the video stream with the matrix barcode timestamp at the particular time and the audio stream with the tone timestamp at the particular time are received. The matrix barcode timestamp is decoded to determine a first time value and the tone timestamp is decoded to determine a second time value. The first time value is compared with the second time value to determine synchronization of the video stream and the audio stream.

9 Claims, 12 Drawing Sheets

(56) References Cited

U.S. PATENT DOCUMENTS

| | | | |
|---|---|---|---|
| 2007/0276670 A1* | 11/2007 | Pearlstein | 704/270 |
| 2008/0010658 A1* | 1/2008 | Abbott | H04N 7/17318 |
| | | | 725/87 |
| 2008/0037954 A1* | 2/2008 | Lee | H04N 21/234318 |
| | | | 386/270 |
| 2008/0263612 A1* | 10/2008 | Cooper | 725/116 |
| 2009/0031373 A1 | 1/2009 | Hogyoku | |
| 2009/0204475 A1* | 8/2009 | Cohen | G06Q 20/1235 |
| | | | 725/32 |
| 2009/0295992 A1* | 12/2009 | Richardson et al. | 348/515 |
| 2009/0304082 A1* | 12/2009 | Radhakrishnan | |
| | | | G06F 17/30787 |
| | | | 375/240.15 |
| 2011/0063504 A1* | 3/2011 | Honda | H04N 7/142 |
| | | | 348/512 |
| 2011/0096173 A1* | 4/2011 | Baker | H04N 17/004 |
| | | | 348/192 |
| 2011/0128445 A1* | 6/2011 | Carrieres | H04N 17/00 |
| | | | 348/512 |
| 2011/0261257 A1* | 10/2011 | Terry | G06K 9/00221 |
| | | | 348/515 |
| 2011/0298978 A1* | 12/2011 | Strein | H04N 17/004 |
| | | | 348/512 |
| 2012/0033134 A1* | 2/2012 | Strein | H04N 5/04 |
| | | | 348/515 |
| 2012/0188442 A1 | 7/2012 | Kennedy | |
| 2013/0007201 A1* | 1/2013 | Jeffrey et al. | 709/217 |
| 2013/0124462 A1* | 5/2013 | Bryan | G06F 17/30743 |
| | | | 707/610 |
| 2013/0162902 A1* | 6/2013 | Musser, Jr. | G11B 27/10 |
| | | | 348/515 |
| 2013/0177199 A1* | 7/2013 | Subramanian et al. | 382/100 |
| 2013/0343467 A1* | 12/2013 | Sogani et al. | 375/240.25 |

* cited by examiner

SYSTEMS AND METHODS FOR DETECTING AUDIO-VIDEO SYNCHRONIZATION USING TIMESTAMPS

TECHNICAL FIELD

This disclosure relates to systems and methods for detecting audio-video synchronization of media content using timestamps.

BACKGROUND

The amount of streaming media content (e.g., steaming video content, live broadcasted video streams, etc.) available over the internet is growing. Often times, an audio stream and a video stream for streamed media content are not synchronized. For example, content in a video stream can lag behind content in an audio stream, or vice versa. As a result, an audio-video synchronization error (e.g., a lip synchronization error) can occur.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a media component, a first timestamp component and a second timestamp component. The media component generates a media stream. The media stream includes a video stream and an audio stream. The first timestamp component adds a matrix barcode timestamp onto a video frame of the video stream at a first time. The second timestamp component embeds a tone timestamp into the audio stream at the first time.

In accordance with another implementation, a system includes a media component, a parse component and a comparison component. The media component receives a media stream with a video stream and an audio stream. The video stream includes a matrix barcode timestamp at a particular time and the audio stream includes a tone timestamp at the particular time. The parse component decodes the matrix barcode timestamp to determine a first time value associated with the video stream and decodes the tone timestamp to determine a second time value associated with the audio stream. The comparison component compares the matrix barcode timestamp with the tone timestamp to determine synchronization of the video stream and the audio stream.

Additionally, a non-limiting implementation provides for generating a media stream that includes a video stream and an audio stream, adding a matrix barcode timestamp onto a video frame of the video stream at a particular time, and embedding a tone timestamp into the audio stream at the particular time.

Furthermore, a non-limiting implementation provides for receiving a media stream with a video stream and an audio stream, where the video stream includes a matrix barcode timestamp at a particular time and the audio stream includes a tone timestamp at the particular time, and comparing the matrix barcode timestamp with the tone timestamp to determine synchronization of the video stream and the audio stream.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
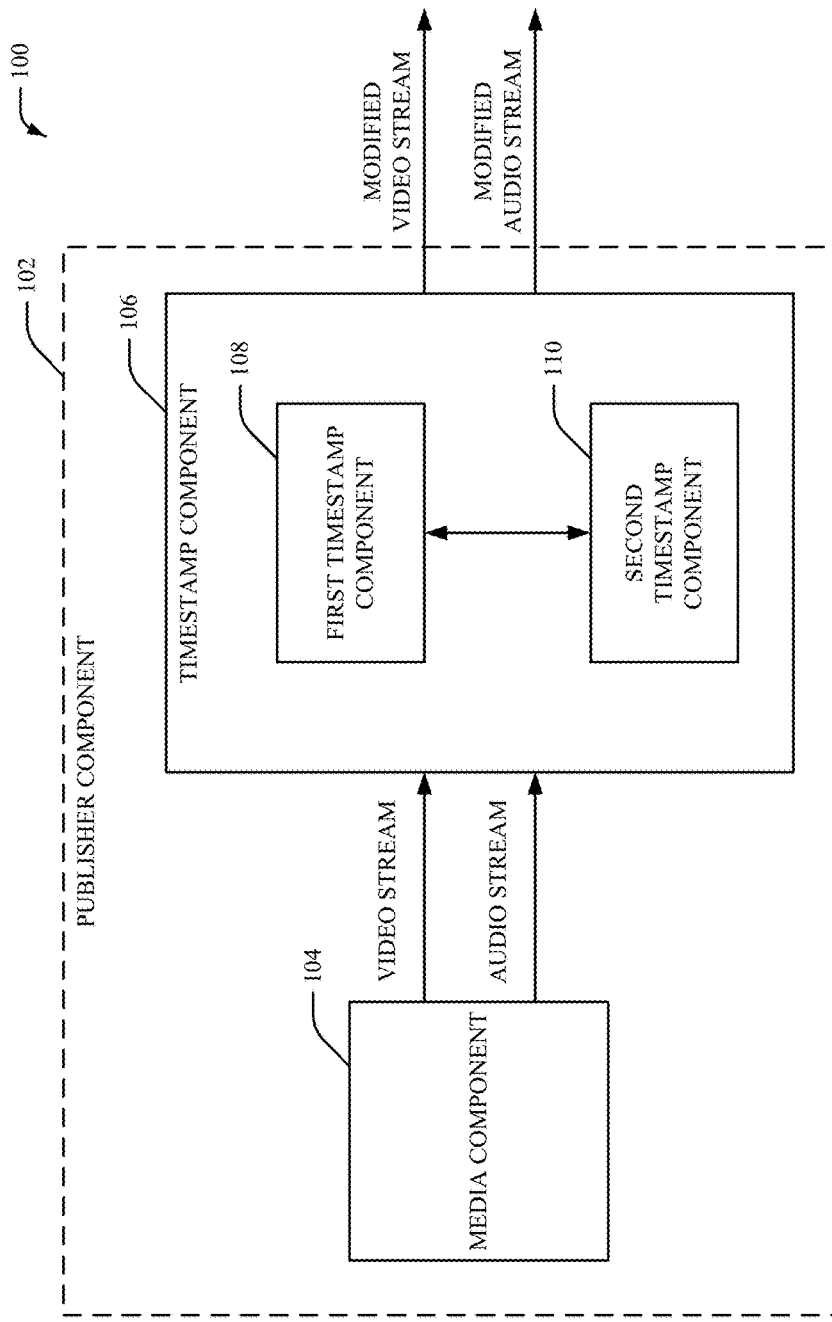
FIG. 1 illustrates a high-level block diagram of an example component that implements one or more timestamps for audio-video synchronization of a media stream, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

The amount of streaming media content (e.g., steaming video content, live broadcasted video streams, etc.) available over the internet is growing. Often times, an audio stream and a video stream for streamed media content are not synchronized. For example, content in a video stream can lag behind content in an audio stream, or vice versa. As a result, an audio-video synchronization error (e.g., a lip synchronization error) can occur. To determine whether an audio-video synchronization error has occurred, streaming video content can be visually compared with streaming audio content. However, this method for determining whether an audio-video synchronization error has occurred is inefficient and/or imprecise.

To that end, techniques for detecting (e.g., testing) audio-video synchronization are presented. For example, end-to-end audio-video synchronization (av-sync) and/or latency for a live media stream can be verified. In one example, av-sync and/or latency between a live stream publisher and a live stream viewer can be detected. As such, audio-video synchronization and/or audio-video latency can be determined for streaming media content. Systems and methods disclosed herein relate to detecting (e.g., testing) audio-video synchronization and/or latency using circuitry and/or instructions stored or transmitted in a computer readable medium. For example, a machine readable (e.g., decodable) matrix barcode timestamp and a machine hearable (e.g., decodable) tone timestamp can be embedded into a media stream (e.g., on a media publisher side). The embedding of the matrix barcode timestamp and the tone timestamp can be synchronized. Additionally, the matrix barcode timestamp and the tone timestamp can be parsed (e.g., on a media viewer side). As such, placement of the matrix barcode timestamp in the media stream can be compared with placement of the tone timestamp in the media stream. Accordingly, audio-video synchronization can be determined. Additionally, a time value associated with the matrix barcode timestamp and a time value associated with the tone timestamp can be compared with a corresponding wall clock time value. Accordingly, audio latency and/or video latency can be determined.

Referring initially to FIG. 1, there is illustrated an example system 100 that implements one or more timestamps to determine audio-video synchronization and/or latency of a media stream, according to an aspect of the subject disclosure. The system 100 can be implemented in a testing environment. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

Specifically, the system 100 can provide a component (e.g., a publisher component) with a media feature (e.g., media component 104) and a timestamp feature (e.g., timestamp component 106) that can be utilized in most any media application. The media feature can generate a media stream. The media stream can include a video stream and an audio stream. The timestamp feature can include a first timestamp feature (e.g., first timestamp component 108) and a second timestamp feature (e.g., second timestamp component 110). The first timestamp feature can add a matrix barcode timestamp onto a video frame of the video stream at a first time. Additionally, the second timestamp component can embed a tone timestamp into the audio steam at the first time. For example, the tone timestamp can be a dual-tone multi-frequency (DTMF) tone timestamp. The system 100 can be employed by various systems, such as, but not limited to, computing systems, computing devices, mobile phones (e.g., smart phones), tablets, image and video capturing systems, media player systems, televisions, personal data assistants, gaming systems, and the like.

In particular, the system 100 can include a publisher component 102. The publisher component 102 can be implemented by a media sender (e.g., a media sender device). For example, the publisher component 102 can be implemented by a live stream system publisher. In FIG. 1, the publisher component 102 includes a media component 104 and a timestamp component 106. The timestamp component 106 includes a first timestamp component 108 and a second timestamp component 110. The media component 104 can generate a media stream. The media stream can include a video stream and an audio stream. For example, the media component 104 can generate a video stream (e.g., VIDEO STREAM shown in FIG. 1) and an audio stream (e.g., AUDIO STREAM shown in FIG. 1). In one example, the media stream can be a looped video clip. The video stream can comprise a video format such as, but not limited to, H.263, H.264 AVC, MPEG-4 SP, VP8, etc. The audio stream can comprise an audio format such as, but not limited to, AAC LC/LTP, HE-AACv1(AAC+), HE-AACv2 (enhanced AAC+), AMR-NB, AMR-WB, FLAC, MP3, MIDI, Vorbis, PCM/WAVE, etc. The timestamp component 106 can modify the video stream and/or the audio stream. As such, the timestamp component 106 can generate a modified video stream (e.g., MODIFIED VIDEO STREAM shown in FIG. 1) and/or a modified audio stream (e.g., MODIFIED AUDIO STREAM shown in FIG. 1). For example, the modified video stream can include one or more matrix barcode timestamps added onto one or more video frames of the video stream. The modified audio stream can include one or more tone timestamps embedded into the audio stream.

The first timestamp component 108 can add a matrix barcode timestamp onto a video frame of the video stream at a particular time (e.g., a first time). For example, the particular time can correspond to a wall clock time (e.g., 9:27:50). In another example, the particular time can correspond to a particular time index (e.g., thumbnail index) of a video stream (e.g., a video clip, a video file, etc.). The matrix barcode timestamp can be a decodable image. For example, the matrix barcode timestamp can be a machine readable time signal. As such, the matrix barcode timestamp can represent the particular time. Additionally, the first timestamp component 108 can add a new matrix barcode timestamp onto a new video frame of the video stream at a new particular time (e.g., a second time). For example, a new matrix barcode timestamp can be added onto a new video frame of the video stream at a repeated time interval. In one example, a new matrix barcode timestamp is added to video stream every second. However, it is to be appreciated that the new matrix barcode timestamp can be added at any time interval.

The second timestamp component 110 can embed a tone timestamp into the audio stream at the particular time (e.g., the first time). For example, the tone timestamp can be embedded into the audio stream in synchronization with the wall clock time (e.g., 9:27:50). In another example, the tone timestamp can be embedded into the audio stream in synchronization with the time index (e.g., thumbnail index) associated with the matrix barcode timestamp. The tone timestamp can be a machine hearable time signal. In one example, the tone timestamp can be a DTMF timestamp. The tone timestamp can represent the particular time. For example, an encoded DTMF number (e.g., DTMF tones) of the tone timestamp can correspond to the particular time. Additionally, the second timestamp component 110 can add a new tone timestamp into the audio stream at the new particular time (e.g., the second time). For example, a new tone timestamp can be added onto the new video frame of the video stream at the repeated time interval. As such, placement of the tone timestamp (e.g., the new tone timestamp) in the audio stream can be synchronized with placement of the matrix barcode timestamp (e.g., the new matrix barcode timestamp) in the video stream.

While FIG. 1 depicts separate components in system 100, it is to be appreciated that the components may be implemented in a common component. In one example, the media component 104 and the timestamp component 106 (e.g., the first timestamp component 108 and/or the second timestamp component 110) can be included in a single component. Further, it can be appreciated that the design of system 100 can include other component selections, component placements, etc., to implement one or more timestamps for audio-video synchronization of a media stream.

Figure 2:
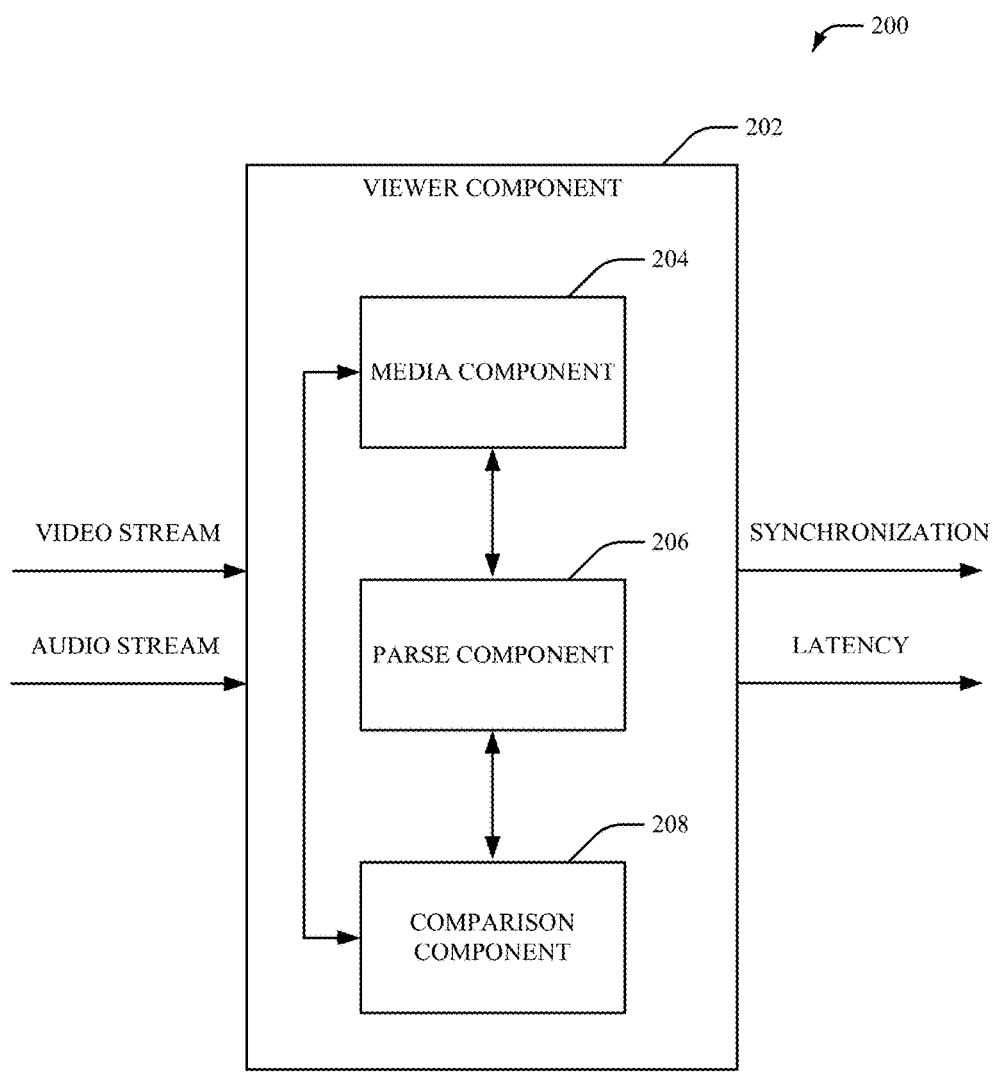
FIG. 2 illustrates a high-level block diagram of a component that detects audio-video synchronization of a media stream using one or more timestamps, in accordance with various aspects and implementations described herein.

Referring now to FIG. 2, there is illustrated an example system 200 that detects audio-video synchronization and/or latency of a media stream using one or more timestamps, according to an aspect of the subject disclosure. The system 200 can be implemented in a testing environment. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

Specifically, the system 200 can provide a component (e.g., a viewer component) with a media feature (e.g., media component 204), a parse feature (e.g., parse component 206) and a comparison feature (e.g., comparison component 208) that can be utilized in most any media application. The media feature can receive a media stream with a video stream and an audio stream. For example, the media stream (e.g., the video stream and the audio stream) can be received from the publisher component 102. The video stream can include a matrix barcode at a particular time and the audio stream can include a tone timestamp at the particular time. The parse feature can decode the matrix barcode timestamp to determine a first time value associated with the video stream. The parse feature can also decode the tone timestamp to determine a second time value associated with the audio stream. The comparison component can compare the matrix barcode timestamp with the tone timestamp to determine synchronization of the video stream and the audio stream. The system 200 can be employed by various systems, such as, but not limited to, computing systems, computing devices, mobile phones (e.g., smart phones), tablets, image and video capturing systems, media player systems, televisions, personal data assistants, gaming systems, and the like.

In particular, the system 200 can include a viewer component 202. The viewer component 202 can be implemented by a media receiver (e.g., a media receiver device). For example, the viewer component 202 can be implemented by a live stream system viewer. In FIG. 2, the viewer component 202 includes a media component 204, a parse component 206 and a comparison component 208. The viewer component 202 (e.g., the media component 204) can receive a video stream (e.g., VIDEO STREAM shown in FIG. 2) and an audio stream (e.g., AUDIO STREAM shown in FIG. 2). For example, the video stream can include one or more matrix barcode timestamps added onto one or more video frames of the video stream. The video stream can comprise a video format such as, but not limited to, H.263, H.264 AVC, MPEG-4 SP, VP8, etc. The audio stream can comprise an audio format such as, but not limited to, AAC LC/LTP, HE-AACv1(AAC+), HE-AACv2 (enhanced AAC+), AMR-NB, AMR-WB, FLAC, MP3, MIDI, Vorbis, PCM/WAVE, etc. The audio stream can include one or more tone timestamps embedded into the audio stream. In one example, the video stream (e.g., a video stream with one or more matrix barcode timestamps) and the audio stream (e.g., an audio stream with one or more tone timestamps) can be generated by the publisher component 102. The viewer component 202 can determine synchronization and/or latency of the video stream and the audio stream. For example, the viewer component can generate a synchronization signal (e.g., SYNCHRONIZATION shown in FIG. 2) and/or a latency signal (e.g., LATENCY shown in FIG. 2).

The media stream received by the media component 204 can be a looped video clip. The media stream can be received at one or more network speeds. For example, the media stream can be received at different network speeds. As such, audio-video synchronization and/or latency can be tested for different network environments. Additionally or alternatively, the media stream can be received based on different coding parameters such as video resolution, video frame rate, video bit rate, video codec, audio codec, audio channels, audio bit rate, etc. Therefore, audio-video synchronization and/or latency can be detected using different consumption mediums, available bandwidths, file sizes, processing capabilities, screen resolutions, screen sizes, available encoders, available decoders, etc. The video stream can include a matrix barcode timestamp at a particular time. The matrix barcode timestamp can be a decodable image. For example, the matrix barcode timestamp can be a machine readable time signal. One or more matrix barcode timestamps can be added onto one or more video frames of the video stream. The audio stream can include a tone timestamp at the particular time. The tone timestamp can be a machine hearable time signal. In one example, the tone timestamp can be a DTMF timestamp. One or more tone timestamps can be embedded into the audio stream.

The parse component 206 can decode the matrix barcode timestamp to determine a first time value associated with the video stream. Additionally, the parse component 206 can decode the tone timestamp to determine a second time value associated with the audio stream. The parse component 206 can generate a screenshot of the video stream in order to decode the matrix barcode timestamp. For example, an image can be generated from a particular video frame with the matrix barcode timestamp in order to decode the matrix barcode timestamp. Furthermore, the parse component can determine a first wall clock time associated with the matrix barcode stamp and a second wall clock time associated with the tone timestamp.

The comparison component 208 can compare the matrix barcode timestamp with the tone timestamp to determine synchronization of the video stream and the audio stream. For example, in response to a determination that the first time value is equal to the second time value, the comparison component 208 can associate the matrix barcode timestamp with the tone timestamp. Therefore, the comparison component 208 can determine difference between the first wall clock time associated with the matrix barcode timestamp and the second wall clock time associated with the tone timestamp. If the calculated difference between the first wall clock time and the second wall clock time is zero, then the matrix barcode timestamp and the tone timestamp are synchronized (e.g., the video stream and the audio stream are synchronized). A difference between the first wall clock time and the second wall clock time can correspond to the matrix barcode timestamp and the tone timestamp not being synchronized. For example, a greater difference between the first wall clock time and the second wall clock time can correspond to a greater amount that the matrix barcode timestamp and the tone timestamp (e.g., the video stream and the audio stream) are not synchronized.

Additionally or alternatively, the comparison component 208 can determine latency for the video stream based on the first time value associated with the matrix barcode timestamp and the first wall clock time. For example, the comparison component 208 can determine difference between the first time value and the first wall clock time. If the difference between the first time value and the first wall clock time is zero, then latency of the video stream is zero. A difference between the first time value and the first wall clock time can correspond to the amount of latency in the video stream. For example, a greater difference between the first time value and the first wall clock time can correspond to a greater amount of latency in the video stream. Additionally or alternatively, the comparison component 208 can determine latency for the audio stream based on the tone timestamp and the second wall clock time. For example, the comparison component 208 can determine difference between the second time value and the second wall clock time. If the difference between the second time value and the second wall clock time is zero, then latency of the audio stream is zero. A difference between the second time value and the second wall clock time can correspond to the amount of latency in the audio stream. For example, a greater difference between the second time value and the second wall clock time can correspond to a greater amount of latency in the audio stream. Therefore, it can be determined how much the video stream and/or the audio stream is delayed by over a network (e.g., the amount of latency over a network).

While FIG. 2 depicts separate components in system 200, it is to be appreciated that the components may be implemented in a common component. In one example, the media component 204, the parse component 206 and/or the comparison component 208 can be included in a single component. Further, it can be appreciated that the design of system 200 can include other component selections, component placements, etc., to detect audio-video synchronization of a media stream.

Figure 3:
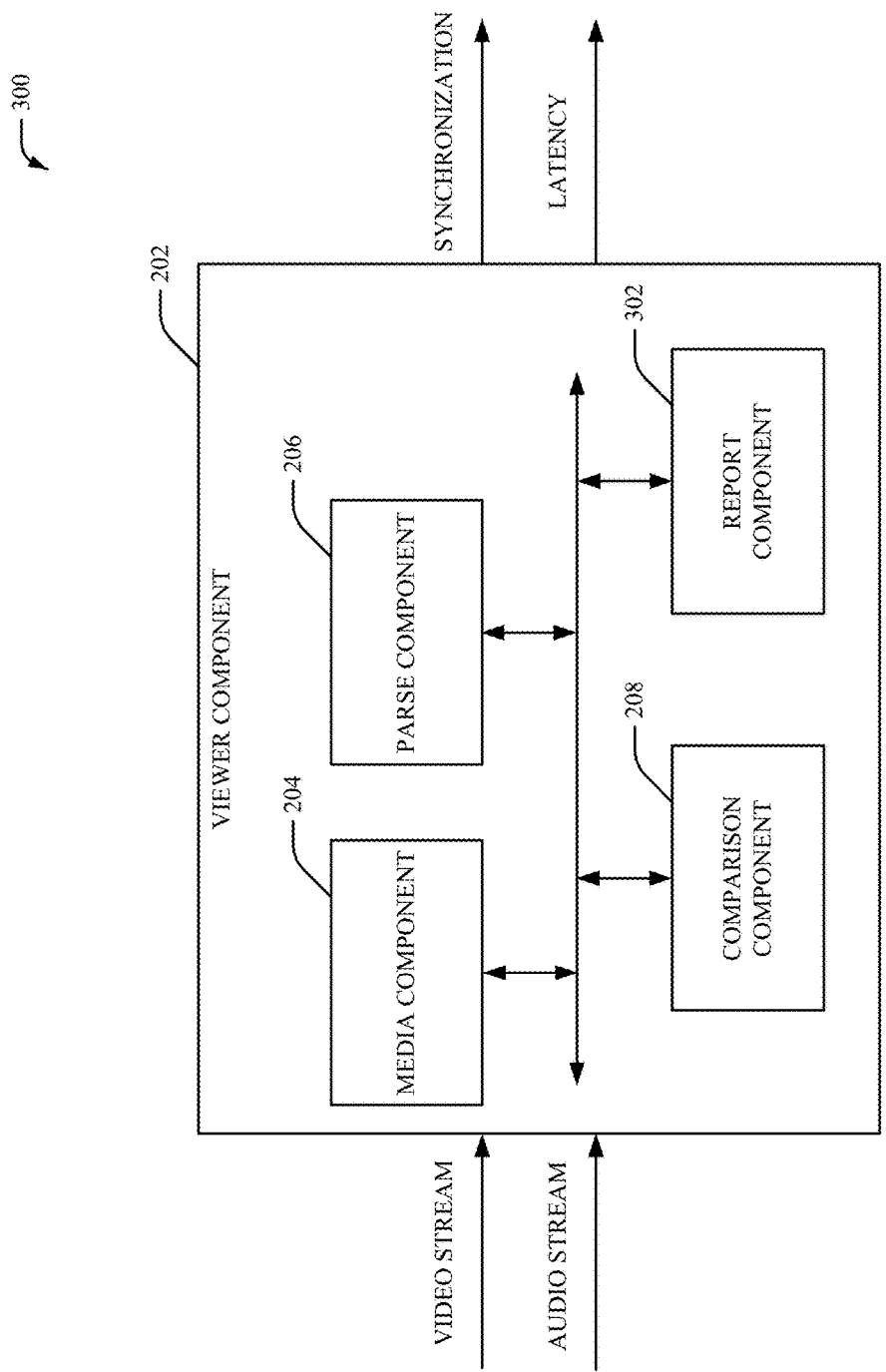
FIG. 3 illustrates a high-level block diagram of a report in a component that detects audio-video synchronization of a media stream using one or more timestamps, in accordance with various aspects and implementations described herein.

Referring now to FIG. 3, there is illustrated a non-limiting implementation of a system 300 in accordance with various aspects and implementations of this disclosure. The viewer component 202 includes the media component 204, the parse component 206, the comparison component 208 and a report component 302.

The report component 302 can upload test results to a server (e.g., a remote server). For example, the report component 302 can upload synchronization results and/or latency results to a server. In one example, the report component 302 can upload test results to a website. The report component 302 can generate a test report. The test report can list the synchronization results and/or the latency results for the media content. Additionally, the report component 302 can generate a plot graph with synchronization data and/or latency data. For example, the plot graph can show how much delay there is between the video stream and the audio stream (e.g., time difference between the video stream and the audio stream). Additionally or alternatively, the plot graph can show the amount of latency for the video stream and/or the audio stream.

Figure 4:
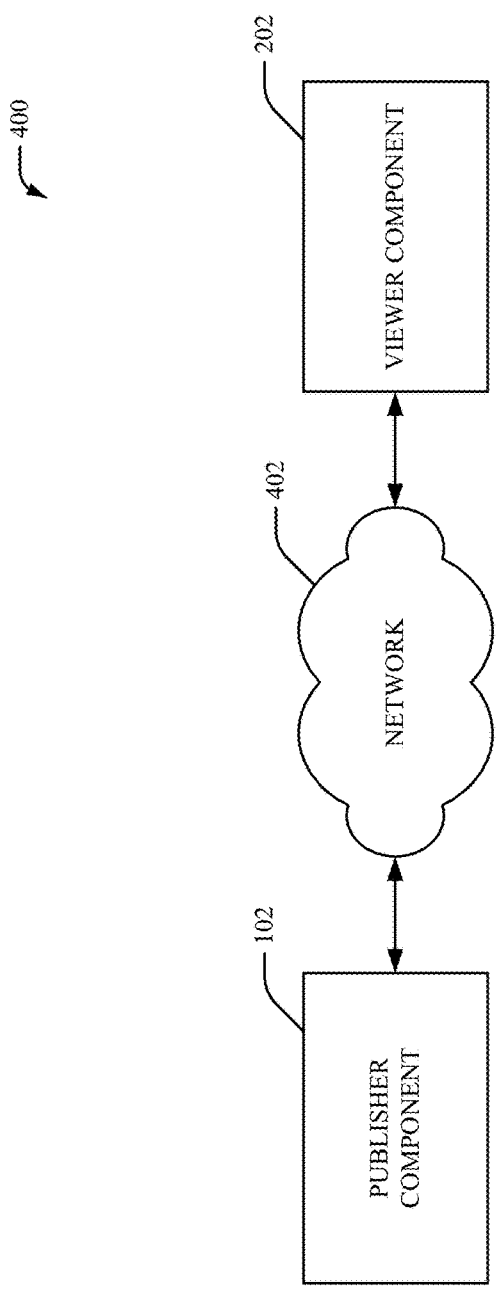
FIG. 4 illustrates a high-level block diagram of a system for detecting audio-video synchronization of a media stream using one or more timestamps, in accordance with various aspects and implementations described herein.

Referring now to FIG. 4, there is illustrated a non-limiting implementation of a system 400 in accordance with various aspects and implementations of this disclosure. The system 400 includes the publisher component 102, the viewer component 202 and a network 402. For example, the publisher component 102 can be implemented by a media sender and the viewer component 202 can be implemented by a media receiver.

The publisher component 102 can generate a video stream and an audio stream. For example, the publisher component 102 can generate a video stream with one or more matrix barcode timestamps and an audio stream with one or more tone timestamps. The viewer component 202 can receive the video stream (e.g., the video stream with one or more matrix barcode timestamps) and the audio stream (e.g., the audio stream with one or more tone timestamps) at a particular network speed over the network 402. Based on placement of the one or more matrix barcode timestamps in the video stream and placement of the tone timestamps in the audio stream, synchronization of the video stream and the audio stream over the network 402 can be determined, as more fully disclosed herein. Additionally or alternatively, latency of the video stream and/or the audio stream over the network 402 can be determined, as more fully disclosed herein.

Figure 5:
FIG. 5 illustrates an example matrix barcode for detecting audio-video synchronization of a media stream, in accordance with various aspects and implementations described herein.

Referring now to FIG. 5, there is illustrated a non-limiting implementation of a matrix barcode timestamp 500 in accordance with various aspects and implementations of this disclosure. The matrix barcode timestamp 500 can be a decodable image. For example, the matrix barcode timestamp 500 can be a machine readable time signal. The matrix barcode timestamp 500 can represent a particular time. For example, the content of the matrix barcode timestamp 500 can represent a particular time (e.g., a wall clock time, a video index time, a thumbnail index time, etc). However, it is to be appreciated that the matrix barcode timestamp 500 can represent a different value not associated with time.

Figure 6:
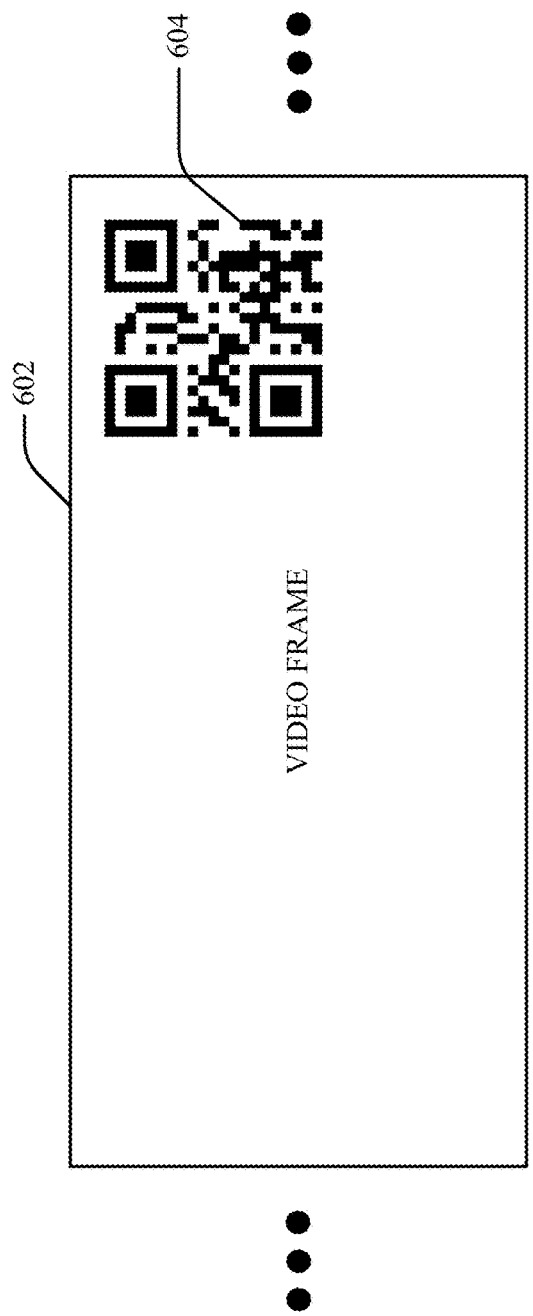
FIG. 6 illustrates an example implementation of a matrix barcode for detecting audio-video synchronization of a media stream, in accordance with various aspects and implementations described herein.

Referring now to FIG. 6, there is illustrated a non-limiting implementation of a video frame 602 with a matrix barcode timestamp 604 in accordance with various aspects and implementations of this disclosure. The video frame 602 can be a particular video frame in a video stream. The video frame 602 can be displayed via a video player. For example, a video stream that includes the video frame 602 can be uploaded to a media content server. As such, the video stream can be streamed via a video player associated with the media content server. The video frame of the video stream can include the matrix barcode timestamp 604. For example, the matrix barcode timestamp 604 can be added onto the particular video frame 602. Therefore, the video frame 602 and the matrix barcode timestamp 604 can be viewed, for example, via the video player associated with the media content server. Similarly, one or more new matrix barcode timestamps can be added to one or more other video frames of the video stream.

Figure 7:
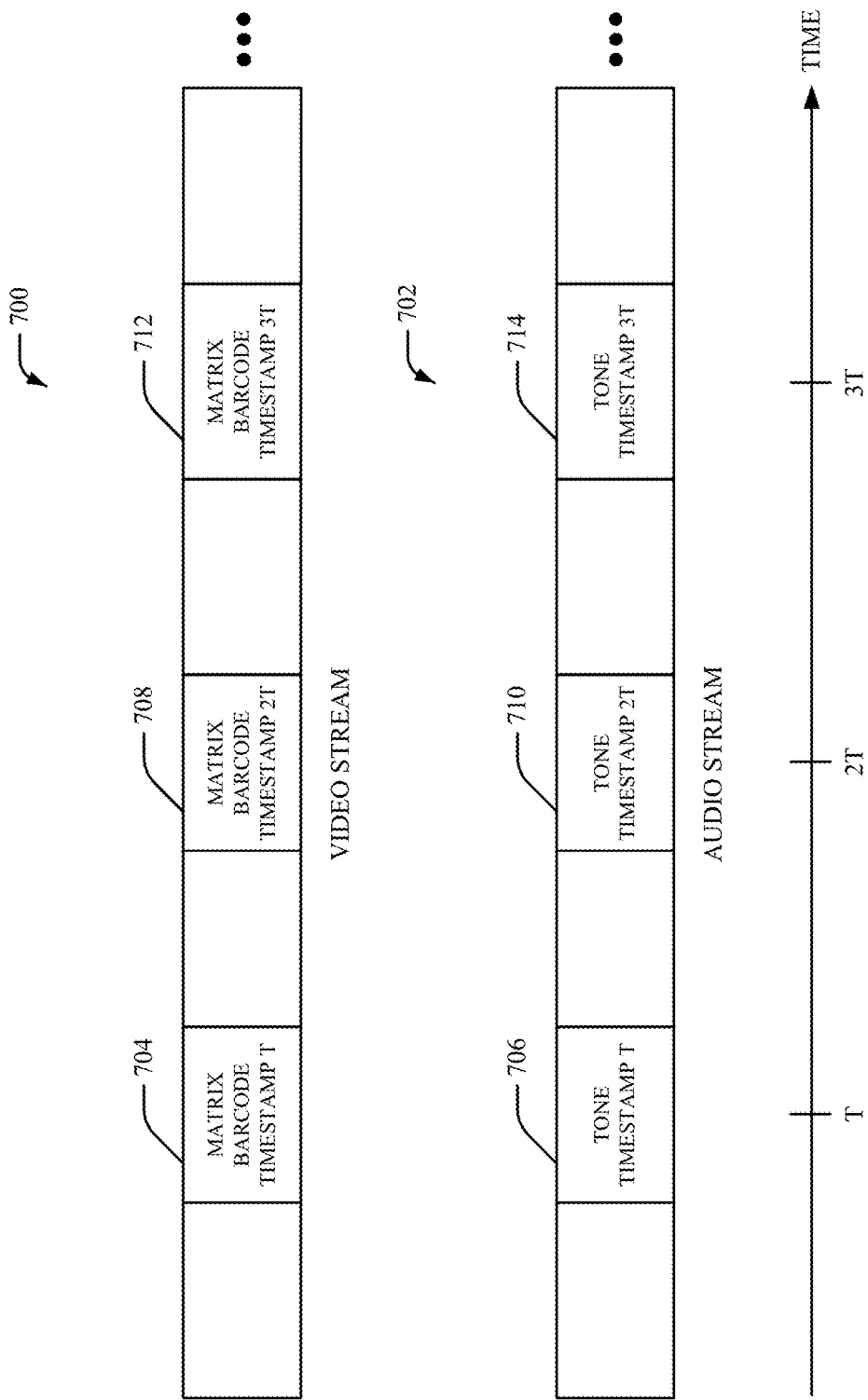
FIG. 7 illustrates an example video stream and an example audio stream with timestamps, in accordance with various aspects and implementations described herein.

Referring now to FIG. 7, there is illustrated a non-limiting implementation of a video stream 700 and an audio stream 702 in accordance with various aspects and implementations of this disclosure. The video stream 700 can include a matrix barcode timestamp 704 that is added onto a particular video frame of the video stream 700 at time T. Additionally, the audio stream 702 can include a tone timestamp 706 that is embedded into the audio stream 702 at the time T. At repeated time intervals, a new matrix barcode timestamp can be added onto a new video frame of the video stream 700 and a new tone timestamp can be embedded into the audio stream 702. For example, at time 2T, a matrix barcode timestamp 708 can be added onto a new video frame of the video stream 700 and a tone timestamp 710 can be embedded into the audio stream. Then, at time 3T, a matrix barcode timestamp 712 can be added onto a new video frame of the video stream 700 and a tone timestamp 714 can be embedded into the audio stream, etc. In one example, T can represent one second. However, it is to be appreciated that T can represent any time value.

Figure 8:
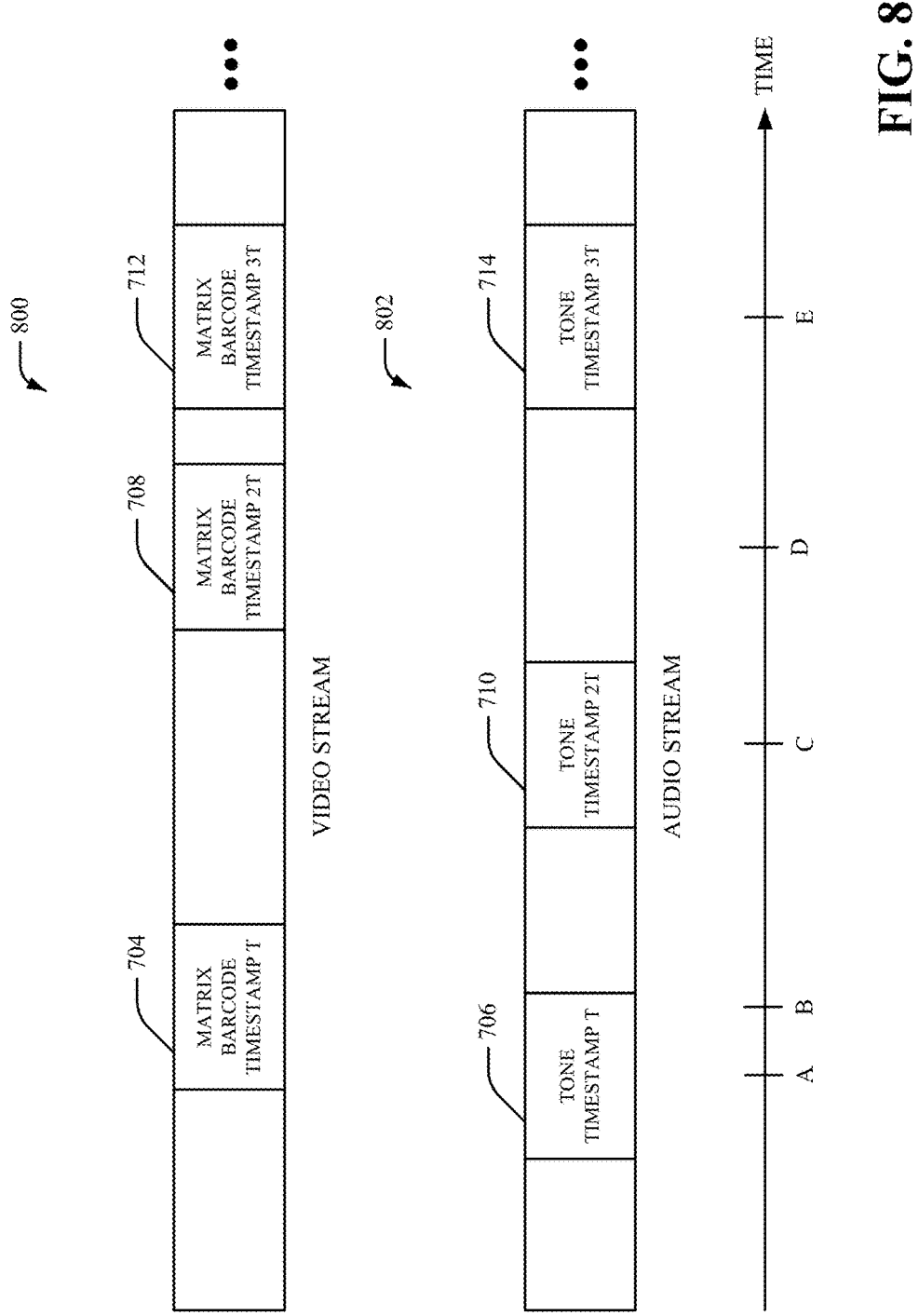
FIG. 8 illustrates another example video stream and another example audio stream with timestamps, in accordance with various aspects and implementations described herein.

Referring now to FIG. 8, there is illustrated a non-limiting implementation of a video stream 800 and an audio stream 802 in accordance with various aspects and implementations of this disclosure. The video stream 800 can include the matrix barcode timestamp 704 at the wall clock time B, the matrix barcode timestamp 708 at the wall clock time D and the matrix barcode timestamp 712 at the wall clock time E. The audio stream 802 can include the tone timestamp 706 at the wall clock time A, the tone timestamp 710 at the wall clock time C and the tone timestamp 714 at the wall clock time E. Synchronization of the matrix barcode timestamp 704 and the tone timestamp 706 can be determined by calculating difference between the wall clock time B and the wall clock time A. Synchronization of the matrix barcode timestamp 708 and the tone timestamp 710 can be determined by calculating difference between the wall clock time D and the wall clock time C. As seen in FIG. 7, the matrix barcode timestamp 704 and the tone timestamp 706 are more closely synchronized than the matrix barcode timestamp 708 and the tone timestamp 710 (e.g., difference between the wall clock time B and the wall clock time A is smaller than difference between the wall clock time D and the wall clock time C). Furthermore, since the matrix barcode timestamp 712 and the tone timestamp 714 are both at wall clock time E (e.g., difference between the matrix barcode timestamp 712 and the tone timestamp 714 is zero), the matrix barcode timestamp 712 and the tone timestamp 714 are synchronized.

Furthermore, latency can be determined by comparing a timestamp with a corresponding wall clock time. As an example, video latency of the matrix barcode timestamp 704 can be determined by calculating difference between the value of the wall clock time B and the value represented by the matrix barcode timestamp 704. Audio latency of the tone timestamp 706 can be determined by calculating difference between the value of the wall clock time A and the value represented by the tone timestamp 706.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 9:
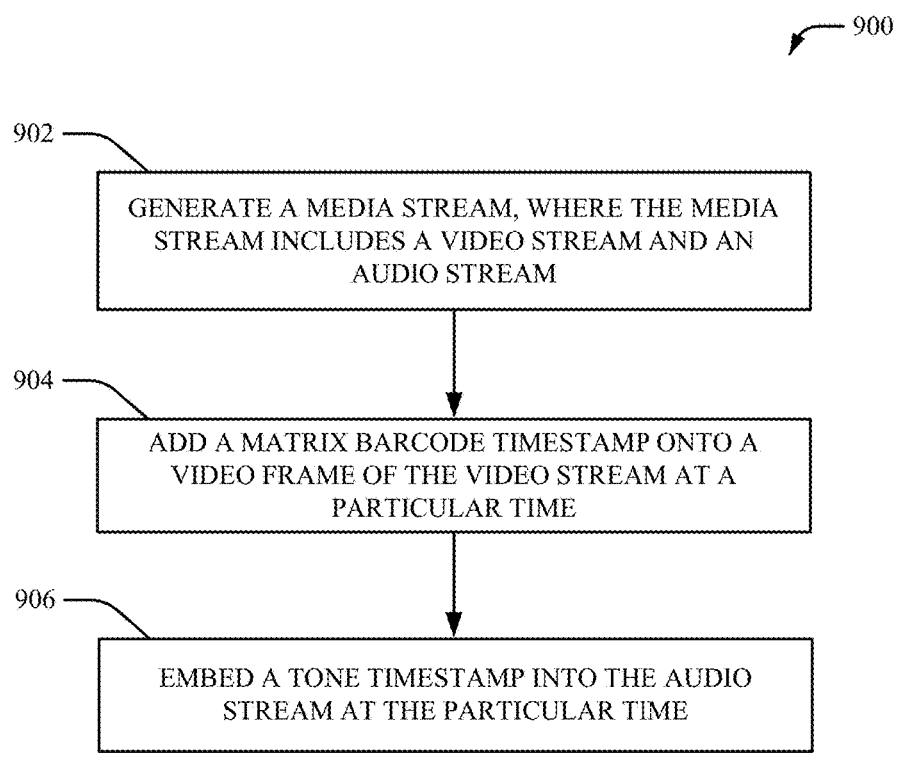
FIG. 9 depicts a flow diagram of an example method for implementing one or more timestamps for audio-video synchronization of a media stream, in accordance with various aspects and implementations described herein.
Figure 10:
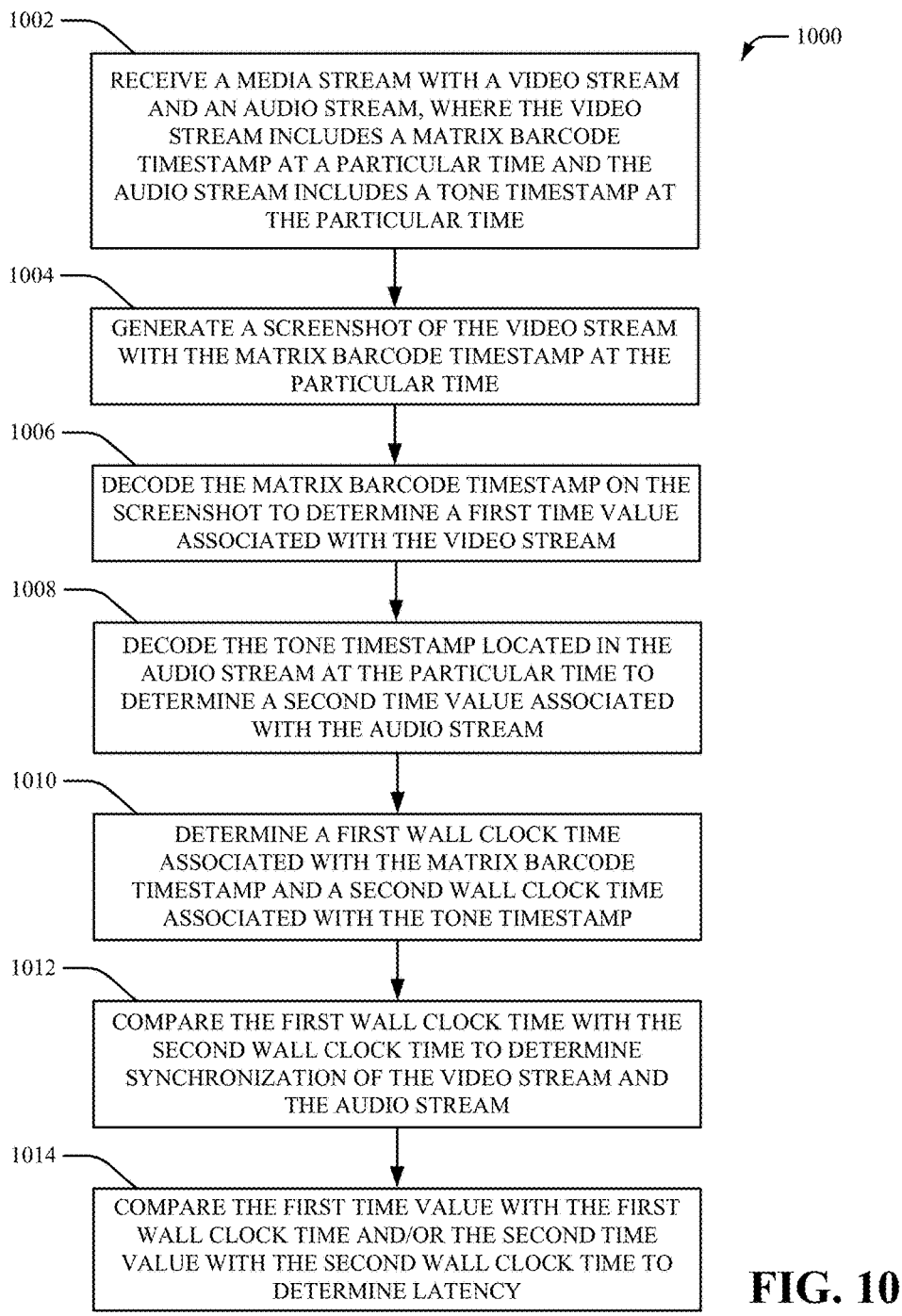
FIG. 10 depicts a flow diagram of an example method for detecting audio-video synchronization of a media stream using one or more timestamps, in accordance with various aspects and implementations described herein.

FIGS. 9-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 9, there illustrated is a methodology 900 for implementing one or more timestamps for detecting audio-video synchronization of a media stream, according to an aspect of the subject innovation. As an example, methodology 900 can be utilized in various applications, such as, but not limited to, computing systems, computing devices, mobile phones (e.g., smart phones), tablets, image and video capturing systems, media player systems, televisions, personal data assistants, gaming systems, etc. Specifically, the methodology 900 can implement an image timestamp and a tone timestamp for detecting audio-video synchronization of a media stream.

At 902, a media stream can be generated (e.g., by a media component 104). The media stream can include a video stream and an audio stream. For example, the media stream can be a looped video clip. At 904, a matrix barcode timestamp can be added (e.g., by a first timestamp component 108) onto a video frame of the video stream at a particular time. For example, a decodable matrix barcode timestamp that represents a particular time (e.g., a wall clock time, a video index time, a thumbnail index time, etc.) can be added onto a particular video frame of the video stream. At 908, a tone timestamp can be embedded (e.g., by a second timestamp component 110) into the audio stream at the particular time. For example, a DTMF tone timestamp can be added into the audio stream at the particular time. Similarly, one or more additional matrix barcode timestamps can be added to one or more other video frames in the video stream and one or more additional tone timestamps can be added to the audio stream.

Referring to FIG. 10, there illustrated is an example methodology 1000 for detecting audio-video synchronization of a media stream using one or more timestamps. At 1002, a media stream with a video stream and an audio stream can be received (e.g., by a media component 204). The video stream can include a matrix barcode at a particular time and the audio stream can include a tone timestamp at the particular time. For example, the media stream can be received by the publisher component 102. The tone timestamp can be a DTMF tone timestamp. At 1004, a screenshot of the video stream with the matrix barcode timestamp at the particular time can be generated (e.g., by a parse component 206). For example, a screenshot of a particular video frame in the video stream with the matrix barcode timestamp representing the particular time can be generated. At 1006, the matrix barcode on the screenshot can be decoded (e.g., by a parse component 206) to determine a first time value associated with the video stream. For example, the first time value can be the particular time encoded in the matrix barcode timestamp. At 1008, the tone timestamp located in the audio stream at the particular time can be decoded (e.g., by a parse component 206) to determine a second time value associated with the audio stream. For example, the second time value can be the particular time encoded in the tone timestamp. At 1010, a first wall clock time associated with the matrix barcode timestamp and a second wall clock time associated with the tone timestamp can be determined (e.g., by a parse component 206). For example, a first wall clock time associated with the matrix barcode timestamp and a second wall clock time associated with the tone timestamp can be recorded. At 1012, the first wall clock time can be compared (e.g., by a comparison component 208) with the second wall clock time to determine synchronization of the video stream and the audio stream. For example, difference of the first wall clock time and the second wall clock time can be determined. A lower difference can represent a more synchronized video stream and audio stream. At 1014, the first time value can be compared (e.g., by a comparison component 208) with the first wall clock time to determine video latency. Additionally or alternatively, the second time value can be compared (e.g., by a comparison component 208) with the second wall clock time to determine audio latency. For example, difference of the first time value and the wall clock time and/or difference of the second time value and the second wall clock time can be determined. A lower difference can represent a lower latency.

Figure 11:
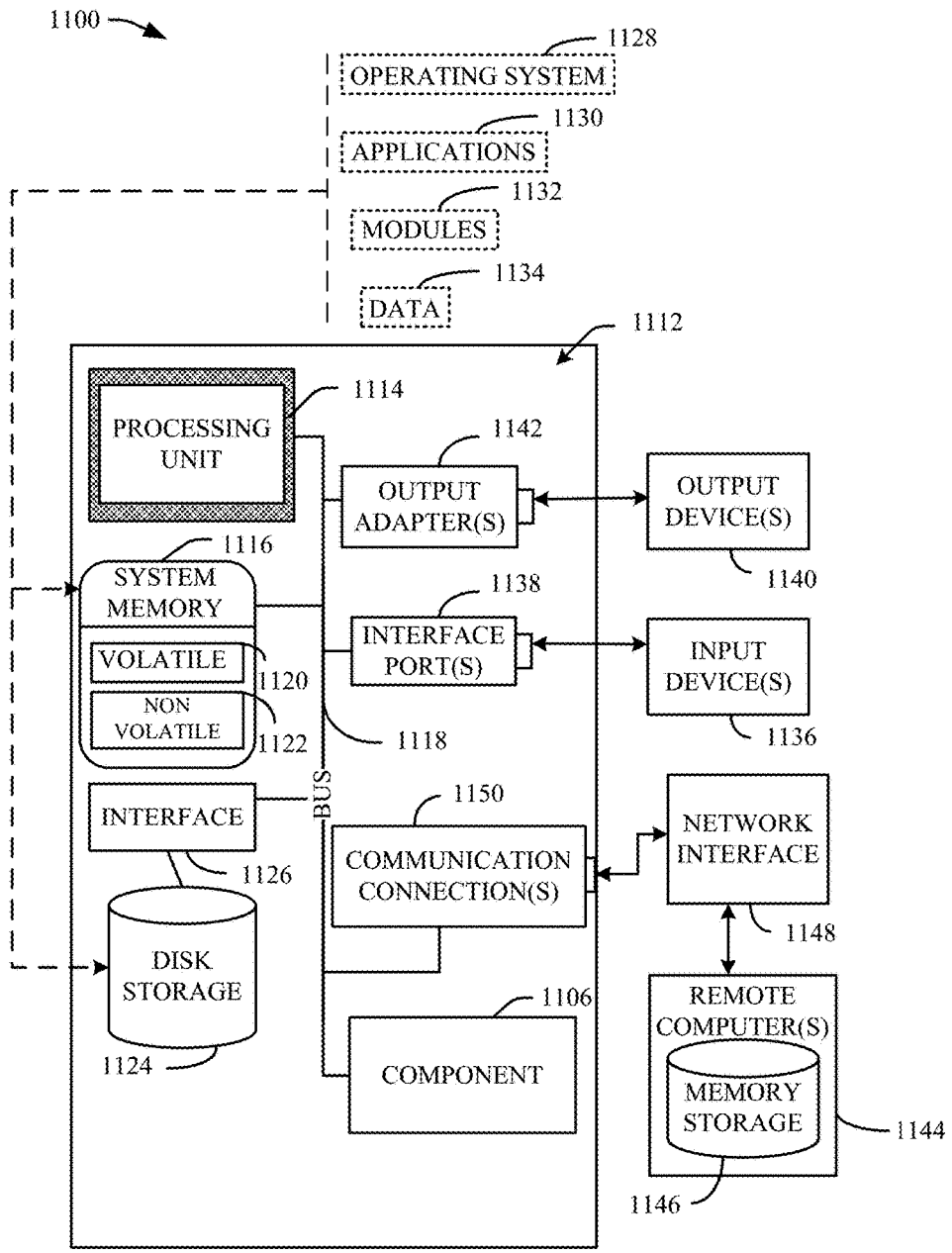
FIG. 11 is a schematic block diagram illustrating a suitable operating environment.
Figure 12:
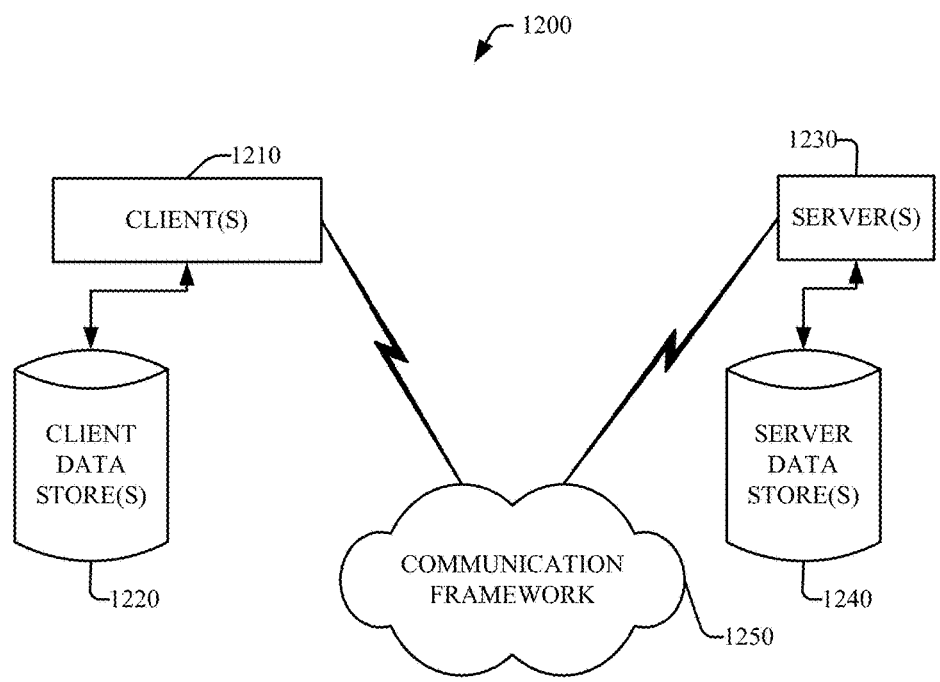
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/nonvolatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

It is to be appreciated that the computer 1112 can be used in connection with implementing one or more of the systems or components shown and described in connection with FIGS. 1-5. In accordance with various aspects and implementations, the computer 1112 can be used to detect and/or test audio-video synchronization of a media stream (e.g., a video stream and an audio stream). In certain exemplary embodiments, the computer 1112 includes a component 1106 (e.g., the publisher component 102 and/or the viewer component 202) that can contain, for example, a media component 104, a timestamp component 106, a first timestamp component 108, a second timestamp component 110, a media component 204, a parse component 206, a comparison component 208 and/or a report component 302, each of which can respectively function as more fully disclosed herein.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., publisher component, viewer component, media component 104, timestamp component 106, first timestamp component 108, second timestamp component 110, media component 204, parse component 206, comparison component 208, report component 302, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory communicatively coupled to the processor, the memory having stored therein computer-executable instructions, comprising:
  a media component configured to:
    receive a matrix barcode timestamp that is part a video stream of a media stream that is being received, wherein the matrix barcode timestamp has encoded a first time value in a machine readable visual format, and
    receive a tone timestamp that is part of an audio stream of the media stream that is being received, wherein the tone timestamp encodes a second time value in a machine hearable audio format;
  a parse component configured to determine a first wall clock time value associated with a receipt of the matrix barcode timestamp and a second wall clock time value associated with a receipt of the tone timestamp;
  a comparison component configured to:
    compare the first wall clock time value with the second wall clock time value;
    determine a difference between the first wall clock time value and the second wall clock time value;
    determine whether a synchronization error exists between of the video stream and the audio stream using the difference between the first wall clock time value and the second wall clock time value; and
    generate a synchronization signal responsive to determining a synchronization error exists between the video stream and the audio stream; and
  a report component configured to upload synchronization results to a server, wherein the tone timestamp is a dual-tone multifrequency (DTMF) timestamp.

2. The system of claim 1, wherein the parse component is further configured to generate a screenshot of the video stream in order to decode the matrix barcode timestamp.

3. The system of claim 1, wherein the media component is further configured to receive the media stream at one or more network speeds.

4. The system of claim 1, wherein the parse component is further configured to:
decode the matrix barcode timestamp to determine the first time value, and decode the tone timestamp to determine the second time value, and wherein the comparison component is further configured to:
compare the first wall clock time value with the first time value to determine latency of the video stream, and
compare the second wall clock time value with the second time value to determine latency of the audio stream.

5. The system of claim 1, wherein the media stream is a looped video clip.

6. A method, comprising:
receiving, by a system including a processor, a matrix barcode timestamp that is part a video stream of a media stream that is being received, wherein the matrix barcode timestamp has encoded a first time value in a machine readable visual format;
receiving, by the system, a tone timestamp that is part of an audio stream of the media stream that is being received, wherein the tone timestamp encodes a second time value in a machine hearable audio format video, wherein the tone timestamp is a dual-tone multifrequency (DTMF) tone timestamp;
determining, by the system, a first wall clock time value associated with a receipt of the matrix barcode timestamp;
determining, by the system, a second wall clock time value associated with a receipt of the tone timestamp;
comparing, by the system, the first wall clock time value with the second wall clock time value;
determining whether a synchronization error exists between the video stream and the audio stream using a difference between the first wall clock value and the second wall clock value;
generating a synchronization-signal responsive to determining a synchronization error exists between the video stream and the audio stream; and
uploading synchronization results to a server.

7. The method of claim 6, further comprising:
decoding by the system, the matrix barcode timestamp to determine the first time value; comparing, by the system, the first wall clock time value with the first time value to determine latency of the video stream, decoding, by the system, the tone timestamp to determine the second time value: and
comparing, by the system, and the second wall clock time value with the second time value to determine latency of the audio stream.

8. The method of claim 6, further comprising generating a screenshot of the video stream in order to decode the matrix barcode timestamp.

9. The method of claim 6, further comprising receiving the media stream at one or more network speeds.

* * * * *